United States Patent
Kimura

(10) Patent No.: US 8,983,659 B2
(45) Date of Patent: Mar. 17, 2015

(54) ROBOT SYSTEM

(71) Applicant: Kabushiki Kaisha Yaskawa Denki, Kitakyushu-shi (JP)

(72) Inventor: Yoshiki Kimura, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 254 days.

(21) Appl. No.: 13/676,096

(22) Filed: Nov. 14, 2012

(65) Prior Publication Data

US 2013/0190924 A1 Jul. 25, 2013

(30) Foreign Application Priority Data

Jan. 24, 2012 (JP) ................................. 2012-011967

(51) Int. Cl.
 G06F 19/00 (2011.01)
 B25J 13/02 (2006.01)
 B25J 9/16 (2006.01)

(52) U.S. Cl.
 CPC ............... B25J 13/02 (2013.01); *Y10S 901/09* (2013.01); B25J 9/1612 (2013.01); *Y10S 901/02* (2013.01); *Y10S 901/14* (2013.01); *Y10S 901/19* (2013.01); *Y10S 901/31* (2013.01); *Y10S 414/136* (2013.01); *Y10S 414/141* (2013.01)
 USPC ........... 700/245; 700/213; 700/214; 700/218; 700/260; 901/2; 901/9; 901/14; 901/19; 901/31; 414/783; 414/936; 414/941

(58) Field of Classification Search
 CPC ............ H01L 21/681; H01L 21/68707; H01L 21/67763; H01L 21/68

USPC ............ 700/218, 214, 245, 260; 901/2, 9, 14, 901/19, 31
 See application file for complete search history.

(56) References Cited

U.S. PATENT DOCUMENTS

| 8,532,818 B2 * | 9/2013 | Ohashi et al. ............... 700/228 |
| 2003/0053904 A1 * | 3/2003 | Kirihata et al. ............... 414/783 |
| 2005/0034288 A1 * | 2/2005 | Adachi et al. ............... 29/25.01 |
| 2006/0192514 A1 * | 8/2006 | Adachi et al. ............ 318/568.13 |
| 2008/0225261 A1 * | 9/2008 | Hirayanagi ..................... 355/72 |

(Continued)

FOREIGN PATENT DOCUMENTS

| JP | 11-307612 | 11/1999 |
| JP | 2003-258076 | 9/2003 |

(Continued)

OTHER PUBLICATIONS

Japanese Decision of a Patent Grant for corresponding JP Application No. 2012-011967, Mar. 4, 2014.

(Continued)

*Primary Examiner* — Khoi Tran
*Assistant Examiner* — Jorge Peche
(74) *Attorney, Agent, or Firm* — Mori & Ward, LLP

(57) ABSTRACT

A robot system according to the embodiments includes a robot that includes a hand including a gripping mechanism that grips a thin plate-shaped work and an arm that moves the hand, and a robot control apparatus that controls the robot. The robot control apparatus, when causing the robot to transfer the work at a predetermined work transfer position by controlling the robot, performs a presence/absence confirmation of the work by operating the gripping mechanism while causing the hand to retract after the hand reaches the work transfer position.

11 Claims, 11 Drawing Sheets

(56) References Cited

U.S. PATENT DOCUMENTS

| | | | |
|---|---|---|---|
| 2009/0285664 A1* | 11/2009 | Kim et al. | 414/730 |
| 2010/0004778 A1* | 1/2010 | Arimatsu et al. | 700/214 |
| 2011/0005967 A1* | 1/2011 | Gregerson et al. | 206/711 |
| 2012/0290133 A1* | 11/2012 | Goto et al. | 700/258 |

FOREIGN PATENT DOCUMENTS

| | | |
|---|---|---|
| JP | 2009-094506 | 4/2009 |
| JP | 2010-110891 | 5/2010 |
| JP | 2011-159738 | 8/2011 |
| JP | 2011159738 A * | 8/2011 |

OTHER PUBLICATIONS

Japanese Office Action for corresponding JP Application No. 2012-011967, Nov. 19, 2013.

Chinese Office Action for corresponding CN Application No. 201210495060.6, Oct. 27, 2014.

* cited by examiner

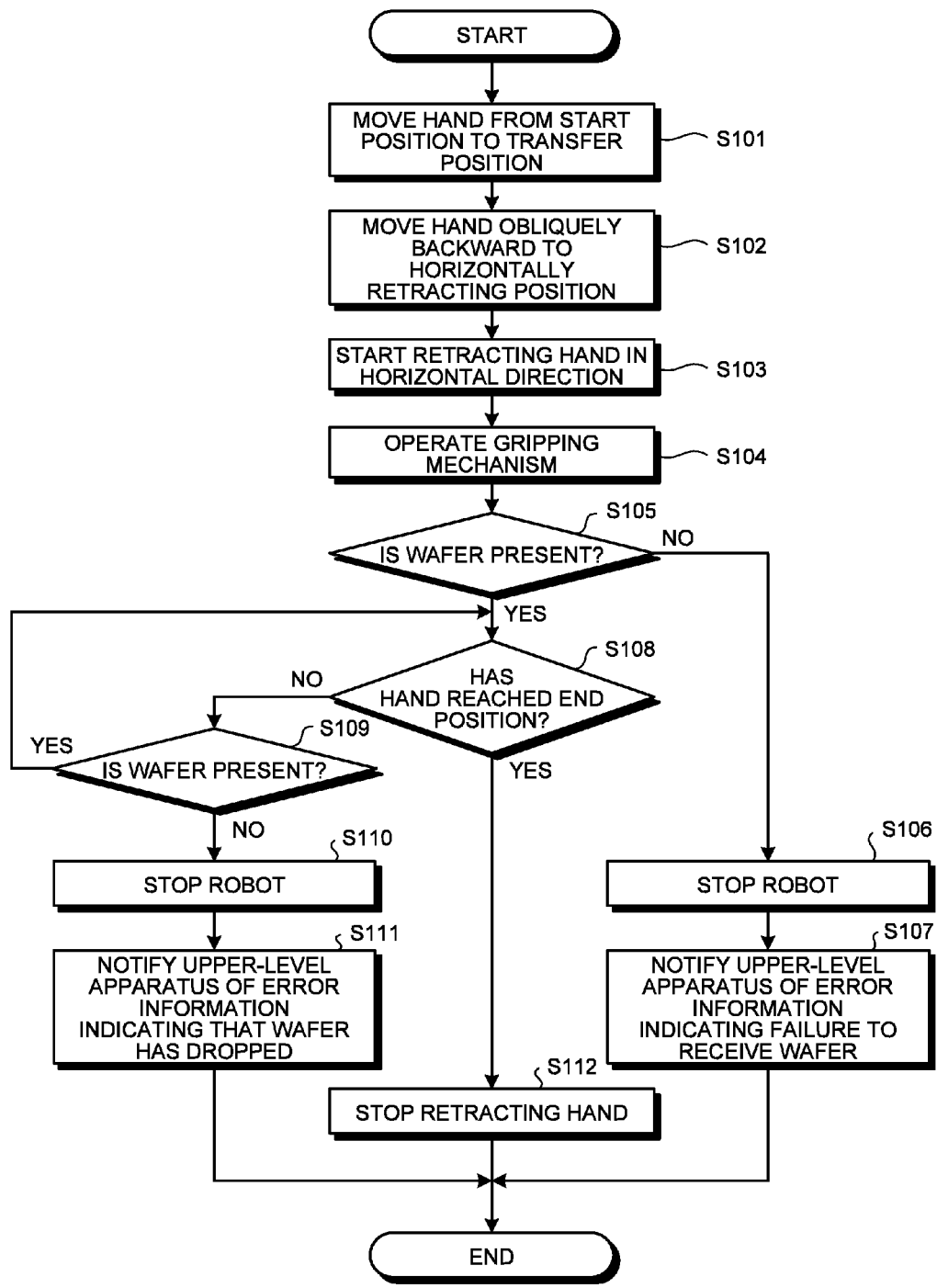

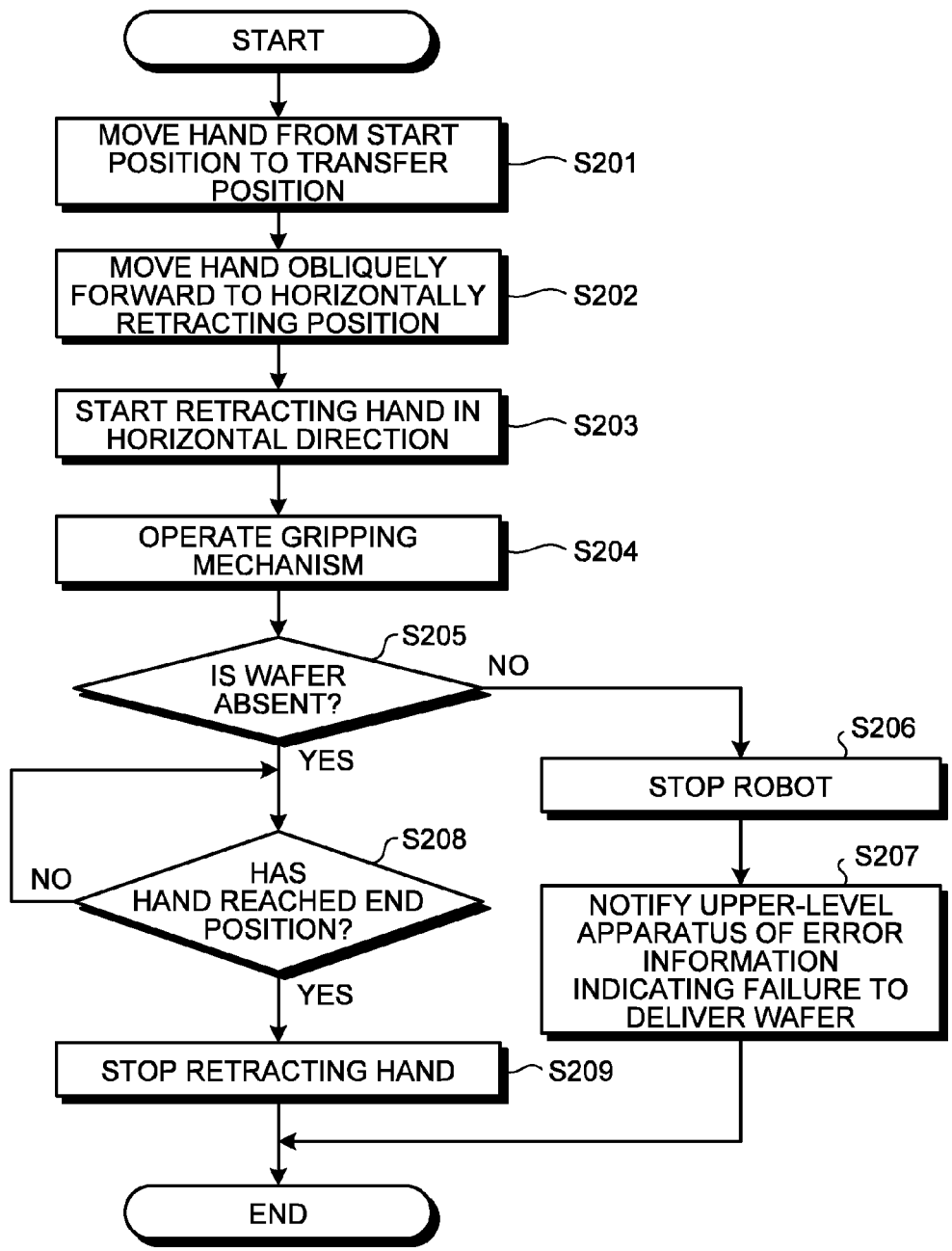

ROBOT SYSTEM

CROSS-REFERENCE TO RELATED APPLICATION

This application is based upon and claims the benefit of priority of the prior Japanese Patent Application No. 2012-011967, filed on Jan. 24, 2012, the entire contents of which are incorporated herein by reference.

FIELD

The embodiments discussed herein are directed to a robot system.

BACKGROUND

Conventionally, there is known a robot system that conveys a substrate, such as a wafer, into or out of a processing apparatus in a semiconductor manufacturing process by using a robot, such as a horizontally articulated robot.

In such a robot system, the importance of safely and reliably conveying a substrate has been increasing with the increase in the size and cost of substrates, which are the objects to be conveyed. Therefore, recently, various technologies for safely and reliably conveying a substrate have been proposed.

For example, Japanese Patent Laid-open Publication 2011-159738 discloses a technology for preventing displacement and the like of a substrate during conveying by providing a robots' hand, which is for placing a substrate, with a gripping mechanism.

In the technology described in Japanese Patent Laid-open Publication 2011-159738, in order to reliably grip a substrate by the gripping mechanism, the robot is temporarily stopped after the robot receives the substrate from a processing apparatus and then the gripping mechanism is operated. Moreover, in the technology described in Japanese Patent Laid-open Publication 2011-159738, the presence or absence of the substrate is confirmed based on the operating state of the gripping mechanism after operating the gripping mechanism and, after it is confirmed that the substrate is present on the hand, the robot is operated again to retract the hand.

However, in the technology described in Japanese Patent Laid-open Publication 2011-159738, the gripping operation and the presence/absence confirmation of the substrate are performed independently of the retracting operation of the hand. In other words, in the technology described in Japanese Patent Laid-open Publication 2011-159738, the retracting operation of the hand is not performed while the gripping operation and the presence/absence confirmation of the substrate are performed, therefore, the time required to convey the substrate may become long.

SUMMARY

A robot system according to an aspect of embodiments includes a robot that includes a hand including a gripping mechanism that grips a thin plate-shaped work and an arm that moves the hand, and a robot control apparatus that controls the robot. The robot control apparatus, when causing the robot to transfer the work at a predetermined work transfer position by controlling the robot, performs a presence/absence confirmation of the work by operating the gripping mechanism while causing the hand to retract after the hand reaches the work transfer position.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 7 is a flowchart illustrating a processing procedure of the wafer receiving processing;

FIG. 8 is a flowchart illustrating a processing procedure of the wafer delivering processing;

DESCRIPTION OF EMBODIMENTS

Hereinafter, embodiments of a robot system disclosed in the present application will be explained in detail with reference to the accompanying drawings. In the embodiments illustrated below, an explanation is given of a case where a robot includes a hand composed of two hands, i.e., an upper hand and a low hand, as an example, however, the robot may include only one hand. This invention is not limited to the following embodiments.

Figure 1:
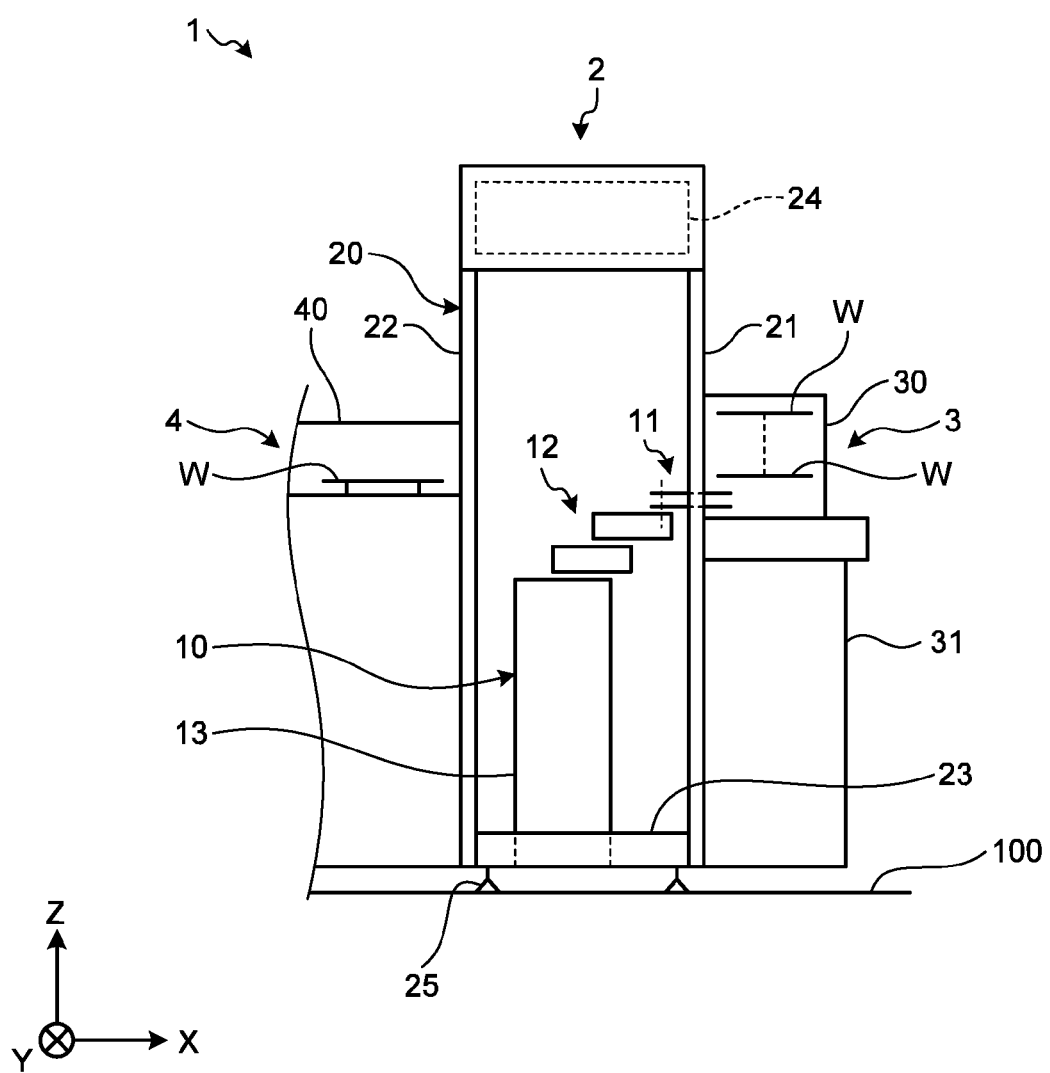
FIG. 1 is a schematic diagram illustrating a configuration of a robot system according to a first embodiment.

First, the configuration of a robot system according to a first embodiment will be explained with reference to FIG. 1. FIG. 1 is a schematic diagram illustrating the configuration of the robot system according to the first embodiment.

In the following, to clarify positional relationships, an X-axis direction, a Y-axis direction, and a Z-axis direction, which are perpendicular to each other, are defined. Moreover, in the following, a Z-axis positive direction is vertically upward and the X-axis direction and the Y-axis direction are horizontal directions.

As shown in FIG. 1, a robot system 1 according to the first embodiment includes a substrate conveying unit 2, a substrate supplying unit 3, and a substrate processing unit 4. The substrate conveying unit 2 includes a robot 10 and a casing 20 that accommodates the robot 10.

The robot 10 includes a hand 11 that can hold a wafer W as an object to be conveyed, an arm 12 that moves the hand 11 in the horizontal direction, and a base 13 that supports the arm 12 so that it is raisable and lowerable and moreover pivotable in the horizontal direction. The base 13 is arranged on a base mounting frame 23 that forms a bottom wall portion of the casing 20.

The robot 10 performs a conveying operation on the wafer W between the substrate supplying unit 3 and the substrate processing unit 4, for example, an operation of receiving the wafer W from the substrate supplying unit 3 and delivering the received wafer W to the substrate processing unit 4.

Moreover, the hand 11 of the robot 10 is provided with a gripping mechanism that grips the wafer W. In addition to the gripping mechanism, a specific configuration and operation of the robot 10 will be described later with reference to FIG. 2.

The casing 20 is, for example, a local cleaning apparatus called EFEM (Equipment Front End Module) and a downflow of clean air is created by a filter unit 24 provided in the upper portion. The inside of the casing 20 is maintained in a high cleanliness state by the downflow.

Leg parts 25 are provided on the lower surface of the base mounting frame 23 and a predetermined clearance is formed between the casing 20 and a mounting surface 100 by the leg parts 25.

The substrate supplying unit 3 is connected to a side surface 21 on the X-axis positive direction side of the casing 20 so that the substrate supplying unit 3 is allowed to communicate with the inside of the casing 20. Moreover, the substrate processing unit 4 is connected to a side surface 22 on the X-axis negative direction side of the casing 20 so that the substrate processing unit 4 is allowed to communicate with the inside of the casing 20. In this manner, in the robot system 1, the substrate supplying unit 3 and the substrate processing unit 4 are connected to each other via the casing 20.

The substrate supplying unit 3 includes a FOUP 30 that stores a plurality of the wafers W in multiple stages in the vertical direction and a table 31 that supports the FOUP 30 at a predetermined height. In the FOUP 30, a not-shown lid is arranged in a state of facing the casing 20 side and the FOUP 30 is connected to the casing 20 via a FOUP opener (not shown) that opens and closes the lid. A plurality of the FOUPs 30 may be arranged in parallel in the Y direction on the table 31.

The substrate processing unit 4 is, for example, a processing unit that performs predetermined processing in a semiconductor manufacturing process, such as cleansing processing, film deposition processing, and photolithography processing, on the wafer W. The substrate processing unit 4 includes a processing apparatus 40 that performs the predetermined processing.

The robot system 1 is configured as above and performs conveying of the wafer W accommodated in the FOUP 30 to the processing apparatus 40, conveying of the wafer W processed by the processing apparatus 40 to the FOUP 30, and the like by using the robot 10.

In the robot system 1 according to the first embodiment, the time required to convey the wafer W is shortened and rubbing of the wafer W is prevented by devising the timing to operate the gripping mechanism that grips the wafer W and the path followed by the hand 11. These points will be specifically explained below.

Figure 2:
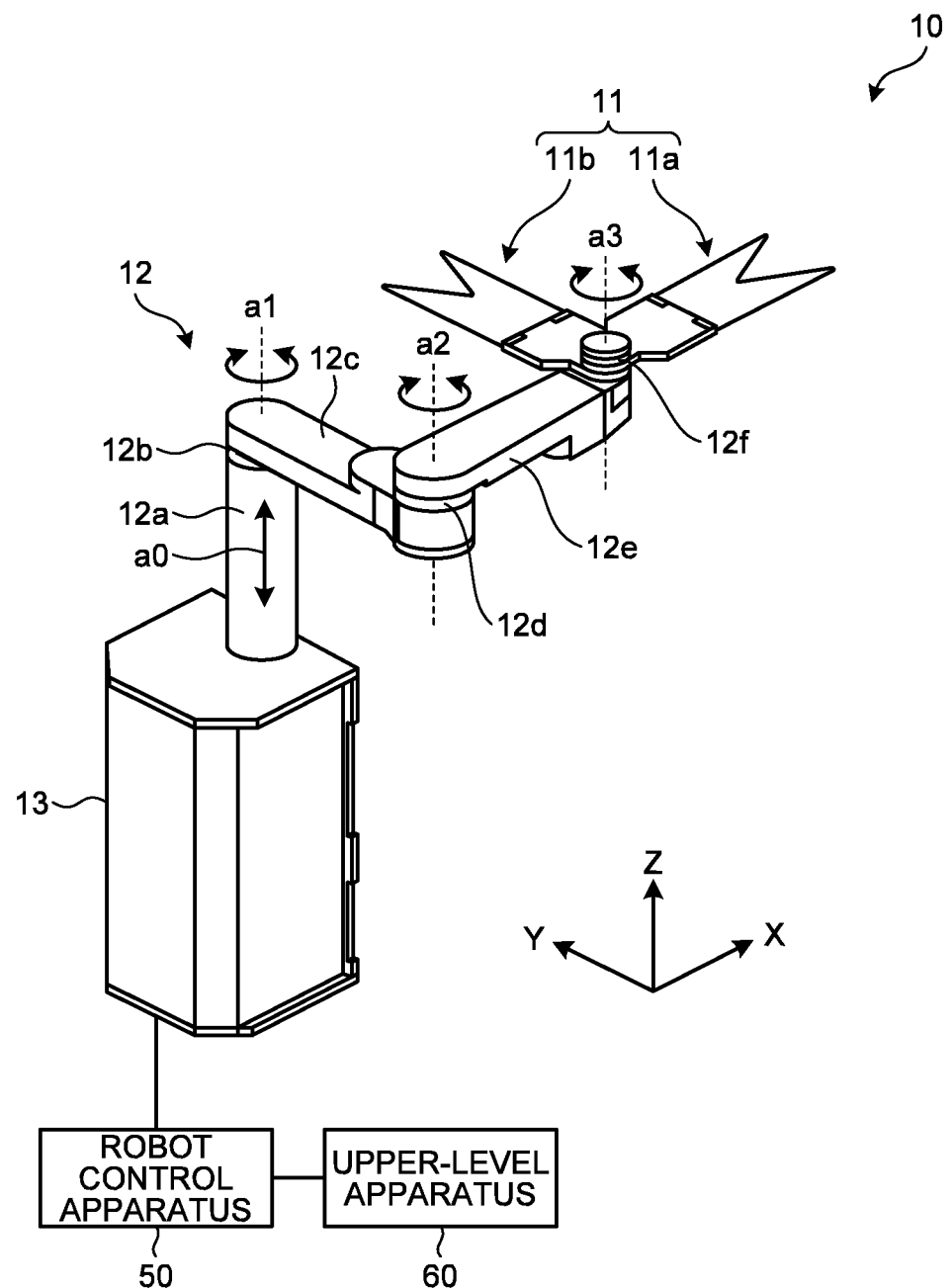
FIG. 2 is a schematic diagram illustrating a configuration of a robot.

FIG. 2 is a schematic diagram illustrating the configuration of the robot 10. As shown in FIG. 2, the robot 10 according to the first embodiment includes the hand 11, the arm 12, and the base 13. Moreover, the arm 12 includes a lifting unit 12*a*, joints 12*b*, 12*d*, and 12*f*, a first arm unit 12*c*, and a second arm unit 12*e*.

The base 13 is a base unit of the robot 10 arranged on the base mounting frame 23 (see FIG. 1). The lifting unit 12*a* is slidably provided in the vertical direction (Z-axis direction) from the base 13 (see double-headed arrow a0 in FIG. 2) and raises and lowers the arm 12 in the vertical direction.

The joint 12*b* is a rotational joint about an axis a1 (see double-headed arrow about the axis a1 in FIG. 2). The first arm unit 12*c* is connected to the lifting unit 12*a* via the joint 12*b* to be rotatable with respect to the lifting unit 12*a*.

Moreover, the joint 12*d* is a rotational joint about an axis a2 (see double-headed arrow about the axis a2 in FIG. 2). The second arm unit 12*e* is connected to the first arm unit 12*c* via the joint 12*d* to be rotatable with respect to the first arm unit 12*c*. Moreover, the joint 12*f* is a rotational joint about an axis a3 (see double-headed arrow about the axis a3 in FIG. 2). The hand 11 is connected to the second arm unit 12*e* via the joint 12*f* to be rotatable with respect to the second arm unit 12*e*.

The robot 10 is provided with a not-shown drive source, such as a motor, and rotates in accordance with the driving of the joints 12*b*, 12*d*, and 12*f*. The arm 12 operates by rotating these joints 12*b*, 12*d*, and 12*f* and moves the hand 11 linearly in the horizontal direction.

In the following, the movement of the hand 11 in the X-axis positive direction is defined as "advancement" and the movement of the hand 11 in the X-axis negative direction is defined as "retraction".

The hand 11 is an end effector that holds the wafer W and includes two hands, i.e., an upper hand 11*a* and a lower hand 11*b* provided at different heights. The upper hand 11*a* and the lower hand 11*b* are provided adjacent to each other with the axis a3 as a common pivot and can pivot about the axis a3 independently of each other.

In the following, for ease of understanding, a case is explained as an example in which the robot 10 conveys the wafers W one by one by using only the upper hand 11*a*. However, the robot 10 can convey two wafers W at the same time by using the upper hand 11*a* and the lower hand 11*b*.

The robot 10 is connected to a robot control apparatus 50 via a communication line, such as a LAN (Local Area Network), to be able to communicate with each other and the operation thereof is controlled by the robot control apparatus 50. The robot control apparatus 50 is, for example, arranged bosom of the robot 10 in the casing (see FIG. 1), outside the casing 20, or the like. The robot 10 and the robot control apparatus 50 may be integrated.

The operation control of various operations of the robot 10 performed by the robot control apparatus 50 is performed based on the operation pattern information stored in the robot control apparatus 50 in advance.

The robot control apparatus 50 is further connected to an upper-level apparatus 60 via a communication line, such as a LAN, to be able to communicate with each other. The upper-level apparatus 60 is an apparatus that performs overall control of the robot system 1 and, for example, transmits processing information on processing to the robot control apparatus 50 and monitors the state of the robot 10.

Figure 3:
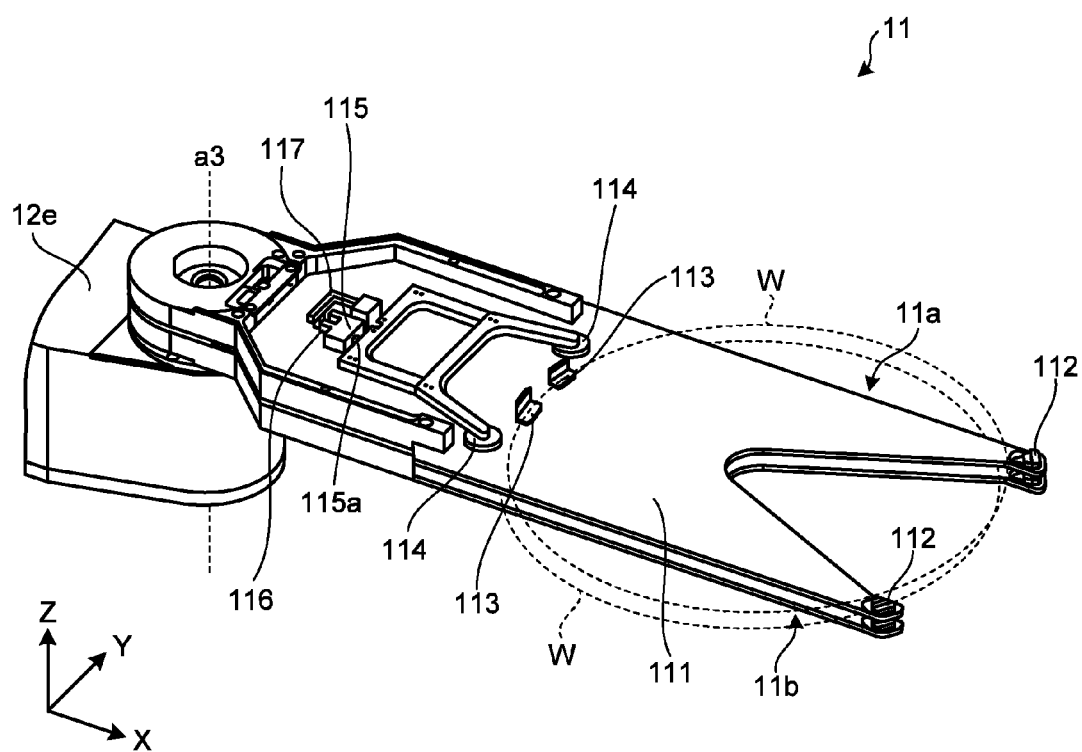
FIG. 3 is a schematic perspective view of a hand.

Next, the configuration of the hand 11 will be explained in detail with reference to FIG. 3. FIG. 3 is a schematic perspective view of the hand 11. FIG. 3 illustrates a state where the tip portions of both the upper hand 11*a* and the lower hand 11*b* are directed to the positive direction in the X-axis.

As shown in FIG. 3, the hand 11 includes the upper hand 11*a* and the lower hand 11*b* provided adjacent to each other at the tip portion of the second arm unit 12*e* with the axis a3 as a common pivot.

In the following, an explanation is principally given of the upper hand 11*a* and a detailed explanation of the lower hand 11*b*, which has the same configuration, is omitted. Therefore, the "upper hand 11*a*" is called the "hand 11" below.

The hand 11 includes a plate 111, tip-side locking units 112, base-end-side locking units 113, a pressing driving unit 115, and pressing units 114. The plate 111 is a member corresponding to a base bottom portion or a base portion on which the wafer W is placed. FIG. 3 exemplifies the plate 111 whose tip side is V-shaped, however, the shape of the plate 111 is not limited to the one shown in FIG. 3.

The tip-side locking units 112 are arranged at the tip portion of the plate 111. Moreover, the base-end-side locking units 113 are arranged at the base end portion of the plate 111. The wafer W is placed between the tip-side locking units 112 and the base-end-side locking units 113.

The hand 11 may be configured to include only the tip-side locking units 112 among the tip-side locking units 112 and the base-end-side locking units 113. Moreover, the shape of the tip-side locking unit 112 and the base-end-side locking unit 113 is not particularly limited as long as they have a surface that comes into contact with the wafer W at least in the horizontal direction and the vertical direction.

The pressing units 114 are provided to be movable in the X-axis positive direction and the X-axis negative direction, i.e., to be able to advance and retract with respect to the wafer W placed on the plate 111. The plate 111 is provided with the pressing units 114 that are biased in the X-axis negative direction.

The pressing driving unit 115 is fixedly provided to the side opposite to the wafer W with the pressing units 114 therebetween and includes a projection 115a capable of advancing and retracting with respect to the pressing units 114. The projection 115a includes, for example, an air cylinder and the like.

The pressing driving unit 115 moves the pressing units 114 toward the wafer W by projecting the projection 115a toward the pressing units 114.

As a result, the wafer W is pushed out toward the tip-side locking units 112 by the pressing units 114 and the periphery of the wafer W on the side opposite to the pressing units 114 comes into contact with the tip-side locking units 112. Consequently, the wafer W enters the state of being held between the pressing units 114 and the tip-side locking units 112, i.e., the state of being gripped by the hand 11.

In this manner, in the robot system 1, the gripping mechanism that grips the wafer W is composed of the tip-side locking units 112, the pressing units 114, and the pressing driving unit 115. The shape of the pressing unit 114, the pressing driving unit 115, and the like shown in FIG. 3 is an example and does not limit the shape thereof.

Moreover, the hand 11 further includes a wafer detecting mechanism for confirming the presence or absence of the wafer W. Specifically, the hand 11 further includes a photoelectric sensor 116 fixed to the pressing driving unit 115 and a light shielding unit 117 movable forward and backward together with the pressing units 114, and the wafer detecting mechanism includes the photoelectric sensor 116 and the light shielding unit 117.

Figure 4A:
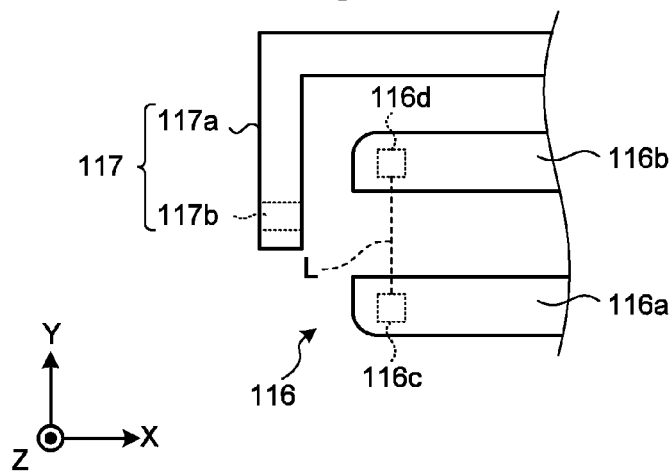
FIG. 4A to FIG. 4C are explanatory diagrams of a configuration and an operation of a wafer detecting mechanism.
Figure 4B:
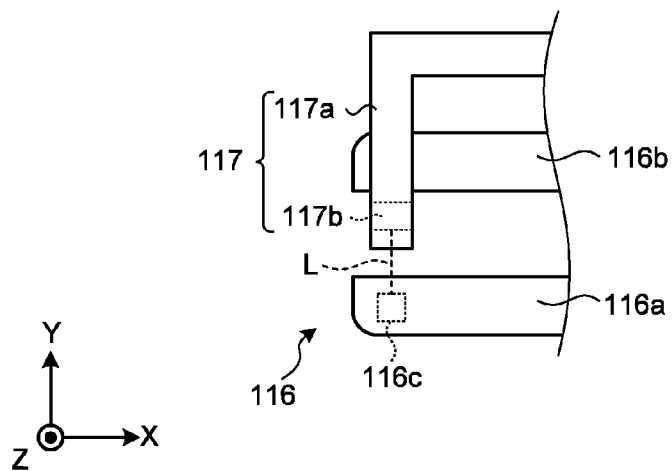
Figure 4C:
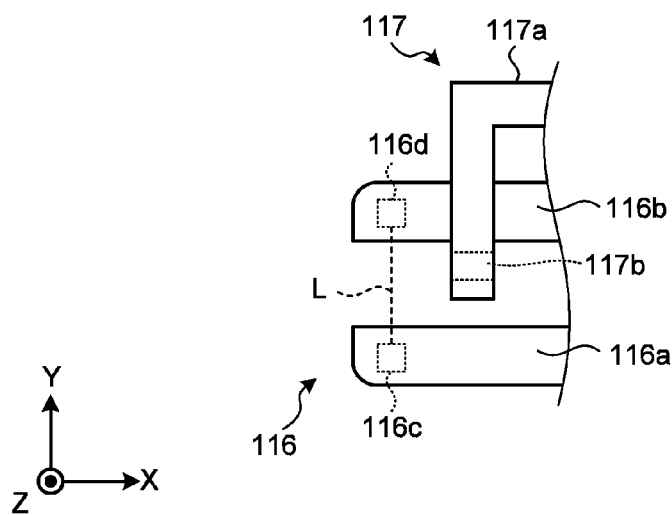

The configuration and the operation of the wafer detecting mechanism will be specifically explained with reference to FIG. 4A to FIG. 4C. FIG. 4A to FIG. 4C are explanatory diagrams of the configuration and the operation of the wafer detecting mechanism.

As shown in FIG. 4A, the photoelectric sensor 116 includes a pair of sidewall portions 116a and 116b arranged with a predetermined interval therebetween in the Y-axis direction. Among the sidewall portions 116a and 116b, the sidewall portion 116a is provided with a light emitting unit 116c that emits light L toward the sidewall portion 116b. Moreover, the sidewall portion 116b is provided with a photoreceptor 116d that receives the light L emitted from the light emitting unit 116c. Then, the photoelectric sensor 116 transmits information on the light receiving state of the light L by the photoreceptor 116d to the robot control apparatus 50.

The light shielding unit 117 includes a first member 117a provided above a pair of the sidewall portions 116a and 116b and a second member 117b projecting vertically downward from the lower portion of the first member 117a.

The light shielding unit 117 is fixed to the pressing units 114 (see FIG. 3) and moves with the movement of the pressing units 114 as shown in FIG. 4B. At this time, the second member 117b of the light shielding unit 117 moves between a pair of the sidewall portions 116a and 116b and is arranged at a position at which the light L from the light emitting unit 116c is shielded when the wafer W is gripped by the pressing units 114 and the tip-side locking units 112.

In such a case, the light receiving state of the photoreceptor 116d changes from "light reception" to "light shielding". Consequently, when the light receiving state is "light shielding", the robot control apparatus 50 can determine that the wafer W is present on the hand 11.

Conversely, when the wafer W is not present on the hand 11, the pressing units 114 (see FIG. 3) move farther than the case where the wafer W is present. As a result, as shown in FIG. 4C, the second member 117b of the light shielding unit 117 stops at a position on the far side (tip side of the hand 11) of the position at which the light L from the light emitting unit 116c is shielded.

In such a case, the light receiving state of the photoreceptor 116d becomes "light reception". Therefore, when the light receiving state is "light reception", the robot control apparatus 50 can determine that the wafer W is not present on the hand 11.

In this manner, in the robot system 1, the presence or absence of the wafer W can be confirmed by using the wafer detecting mechanism. A case is explained here as an example in which the wafer detecting mechanism is composed of the photoelectric sensor 116 and the light shielding unit 117, however, the wafer detecting mechanism may have other configurations.

For example, the wafer detecting mechanism may be configured to use a stroke sensor that detects the amount of movement of the pressing units 114 or the projection 115a. In this case, when the amount of movement of the pressing units 114 or the projection 115a is larger than a predetermined threshold, the robot control apparatus 50 can determine that the wafer W is not present on the hand 11.

Figure 5:
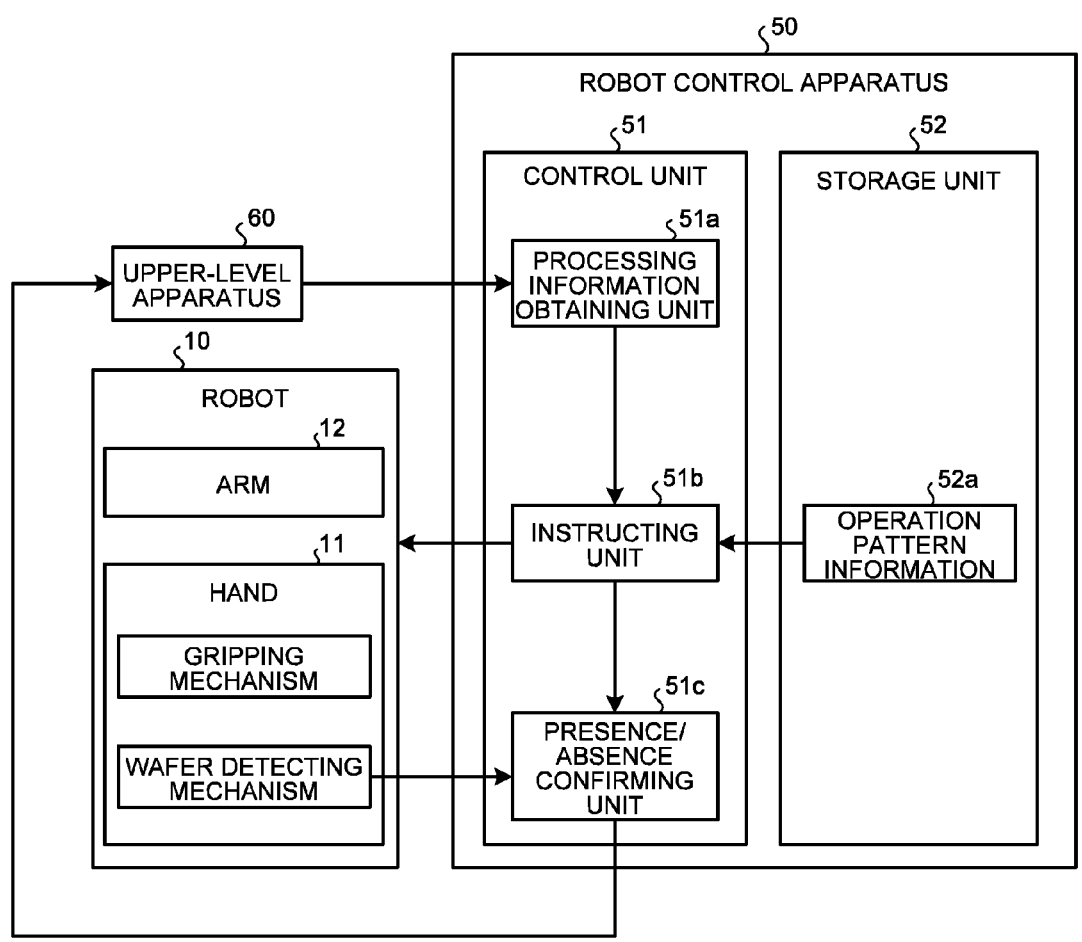
FIG. 5 is a block diagram illustrating a configuration of a robot control apparatus.

Next, the configuration of the robot control apparatus 50 will be explained with reference to FIG. 5. FIG. 5 is a block diagram illustrating the configuration of the robot control apparatus 50. FIG. 5 illustrates components necessary for explaining the characteristics of the robot control apparatus 50 and descriptions of the general components are omitted where appropriate.

As shown in FIG. 5, the robot control apparatus 50 includes a control unit 51 and a storage unit 52. Moreover, the control unit 51 includes a processing information obtaining unit 51a, an instructing unit 51b, and a presence/absence confirming unit 51c. Moreover, the storage unit 52 stores operation pattern information 52a.

The control unit 51 performs overall control of the robot control apparatus 50. The processing information obtaining unit 51a obtains processing information on processing, for which the wafer W is to be supplied and conveyed, from the upper-level apparatus 60. When the processing information obtaining unit 51a obtains the processing information from the upper-level apparatus 60, the processing information obtaining unit 51a notifies the instructing unit 51b of the obtained processing information.

The instructing unit 51b is a processing unit that issues an operation instruction to the robot 10 on the basis of the processing information received from the processing information obtaining unit 51a.

When the instructing unit 51b receives the processing information from the processing information obtaining unit 51a, the instructing unit 51b selects an operation pattern corresponding to the processing information from among a plurality of operation patterns included in the operation pattern information 52a stored in the storage unit 52. Then, the instructing unit 51b issues an operation instruction to the robot 10 to cause the robot 10 to operate according to the selected operation pattern.

Moreover, the instructing unit 51b also performs processing of instructing the presence/absence confirming unit 51c to perform the presence/absence confirmation of the wafer W.

The presence/absence confirming unit 51c is a processing unit that performs the presence/absence confirmation of the wafer W on the hand 11 in accordance with the instruction from the instructing unit 51b. Specifically, when execution of the presence/absence confirmation is instructed from the instructing unit 51b, the presence/absence confirming unit 51c obtains the information on the light receiving state of the photoreceptor 116d (see FIG. 4A) from the wafer detecting mechanism and determines the presence or absence of the wafer W on the basis of the obtained information.

Specifically, when the light receiving state is "light shielding", the presence/absence confirming unit 51c determines that the wafer W is present on the hand 11 and, when the light receiving state is "light reception", the presence/absence confirming unit 51c determines that the wafer W is not present.

Furthermore, the presence/absence confirming unit 51c determines whether transfer of the wafer W is successful in accordance with the determination result and notifies the upper-level apparatus 60 of the determination result.

For example, when the robot 10 is caused to perform the receiving operation of the wafer W, if the presence/absence confirming unit 51c determines that the wafer W is not present, the presence/absence confirming unit 51c determines that reception of the wafer W is unsuccessful. In this case, the presence/absence confirming unit 51c transmits error information indicating a failure to receive the wafer W to the upper-level apparatus 60.

During the wafer receiving operation, the presence/absence confirming unit 51c performs the presence/absence confirmation of the wafer W more than once. The presence/absence confirming unit 51c makes the content of an error to be notified to the upper-level apparatus 60 different in the first presence/absence confirmation and the second and subsequent presence/absence confirmations. This point will be described later.

The storage unit 52 is a storage device, such as a hard disk drive and a nonvolatile memory, and stores the operation pattern information 52a. The operation pattern information 52a is information defining the operation of the robot 10.

The robot control apparatus 50 may be configured, for example, by using a program logic, a wired logic, or the like so that the processing equivalent to the case where the instructing unit 51b uses the operation pattern information 52a can be performed without storing the operation pattern information 52a. Moreover, FIG. 5 illustrates one robot control apparatus 50, however, the robot control apparatus 50 may be composed of a plurality of independent apparatuses and the apparatuses may communicate with each other.

Figure 6A:
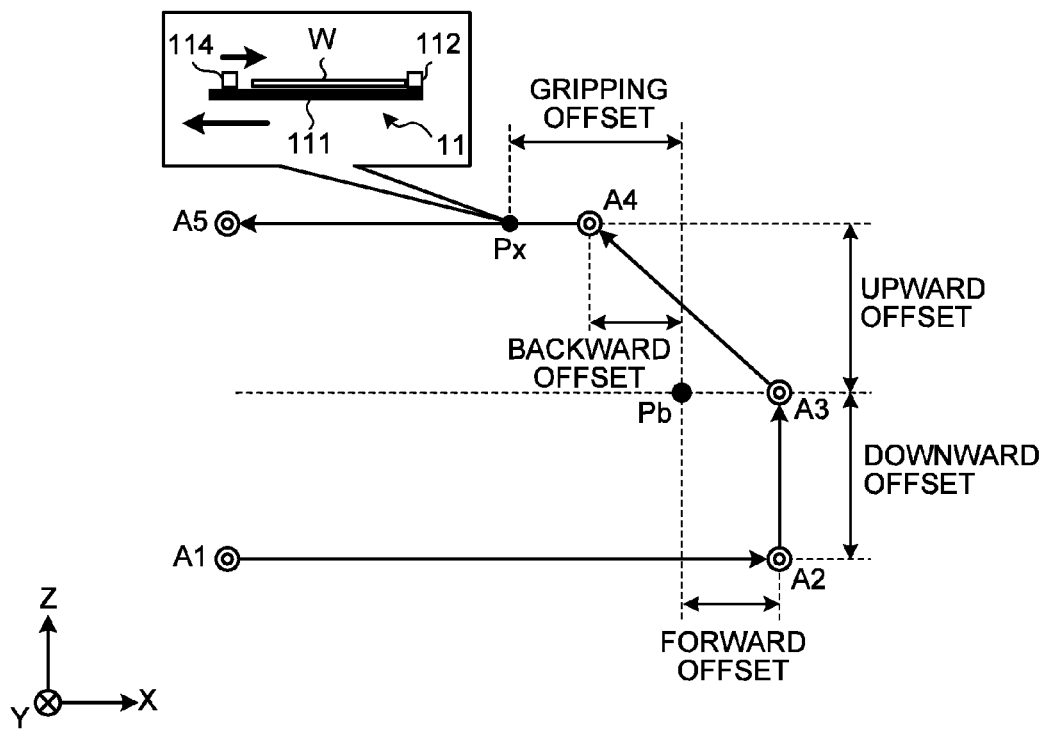
FIG. 6A is an explanatory diagram of a wafer receiving operation according to the first embodiment.
Figure 6B:
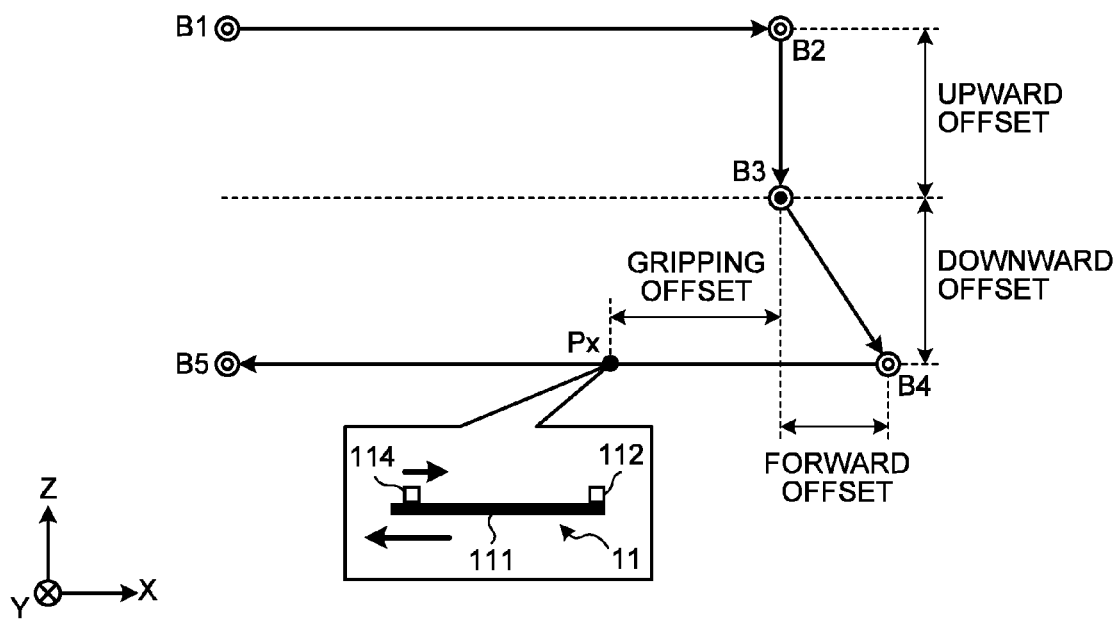
FIG. 6B is an explanatory diagram of a wafer delivering operation according to the first embodiment.

Next, the operation example of the robot 10 according to the first embodiment will be explained with reference to FIG. 6A and FIG. 6B. FIG. 6A is an explanatory diagram of the wafer receiving operation according to the first embodiment and FIG. 6B is an explanatory diagram of the wafer delivering operation according to the first embodiment.

The wafer receiving operation is an operation in which the wafer W is received from the processing apparatus (for example, the FOUP 30) by the robot 10. The wafer delivering operation is an operation in which the wafer W is delivered to the processing apparatus (for example, the processing apparatus 40) by the robot 10.

First, the wafer receiving operation will be explained with reference to FIG. 6A. As shown in FIG. 6A, the instructing unit 51b instructs the robot 10 to move the hand 11 along the route from a position A1 to a position A5 on the basis of the processing information and the operation pattern information 52a.

A position A3 is a position at which the wafer W is transferred between the robot 10 and the processing apparatus. In the following, the position A3 is called the "transfer position A3".

Moreover, the position A1 is a start position of the wafer receiving operation and is, for example, a position at which the hand 11 is arranged when the robot 10 is in a posture (posture in which the turning radius of the robot 10 is minimized) in which the arm 12 is retracted the most.

Moreover, the position A5 is an end position of the wafer receiving operation and is, for example, a position immediately above the start position A1. The start position A1 and the end position A5 are located on the X-axis negative direction side of the transfer position A3. Moreover, the start position A1 is offset downward from the transfer position A3 and the end position A5 is offset upward from the transfer position A3.

Moreover, a position Pb illustrated in FIG. 6A is a reference position for specifying an execution position (hereinafter, described as "gripping execution position Px") of the gripping operation. The reference position Pb can be arbitrarily set within the range in which the gripping execution position Px is not on the X-axis positive direction side of the transfer position A3.

The instructing unit 51b horizontally moves (advances) the hand 11 from the start position A1 toward a raising position A2 immediately below the transfer position A3. Next, the instructing unit 51b raises the hand 11 from the raising position A2 to the transfer position A3. Consequently, the wafer W is placed on the hand 11.

After the hand 11 reaches the transfer position A3, the instructing unit 51b moves (retracts) the hand 11 in the X-axis negative direction while moving (raising) it in the Z-axis positive direction toward a horizontally retracting position A4 that is at the same height as the end position A5 and is offset backward from the transfer position A3. The offset between the reference position Pb and the raising position A2 in the horizontal direction is called a "forward offset" and the offset between the reference position Pb and the horizontally retracting position A4 in the horizontal direction is called a "backward offset".

In this manner, in the first embodiment, the hand 11 is moved obliquely backward from the transfer position A3 toward the horizontally retracting position A4. Therefore, the moving distance of the hand 11 from the transfer position A3 to the horizontally retracting position A4 can be shortened compared with the case where the hand 11 is raised in the vertical direction from the transfer position A3 after it reaches the transfer position A3 and thereafter the hand 11 is retracted to reach the position A4. Thus, according to the first embodiment, the time required to convey the wafer W can be shortened.

Furthermore, in the first embodiment, rubbing of the wafer W can be prevented when receiving the wafer W by moving the hand 11 obliquely backward from the transfer position A3 toward the horizontally retracting position A4.

For example, in some cases, the wafer W accommodated in the FOUP 30 (see FIG. 1) is accommodated in a state where the side surface is in contact with a member, such as a support post, provided on the far side (X-axis positive direction) in the FOUP 30. In such a case, if the wafer W is received by raising the hand 11 vertically upward, the wafer W and the FOUP 30 rub against each other at the contact portion thereof, therefore, the wafer W may be damaged or particles may be generated.

However, in the first embodiment, because the wafer W is raised while moving in a direction away from the far side in the FOUP 30 by moving the hand 11 obliquely backward, the wafer W is not rubbed and thus it is possible to prevent the wafer W from being damaged and particles from being generated.

After the hand 11 reaches the horizontally retracting position A4, the instructing unit 51$b$ retracts the hand 11 to the end position A5. Then, the instructing unit 51$b$ operates the gripping mechanism at the timing at which the hand 11 reaches the gripping execution position Px. Thus, the instructing unit 51$b$ causes the gripping mechanism to perform the gripping operation of the wafer W while retracting the hand 11 to the end position A5.

In this embodiment, a case in which the gripping operation of the wafer W is performed while moving the hand 11 from the horizontally retracting position A4 toward the end position A5 is illustrated as an example, however, the instructing unit 51$b$ may cause the robot 10 to perform the gripping operation while moving the hand 11 from the transfer position A3 to the horizontally retracting position A4.

Next, the instructing unit 51$b$ measures the time elapsed after the instructing unit 51$b$ instructs the robot 10 to perform the gripping operation of the wafer W and, when it is determined that a predetermined time has elapsed, the instructing unit 51$b$ instructs the presence/absence confirming unit 51$c$ to perform the presence/absence confirmation.

The "predetermined time" is a time that is the same as or slightly longer than the time required for the wafer W to be gripped after the pressing units 114 are advanced. In this manner, when the time specified based on the time required for the wafer W to be gripped after the pressing units 114 are advanced has elapsed, the instructing unit 51$b$ instructs execution of the presence/absence confirmation. Thus, the instructing unit 51$b$ can cause the presence/absence confirming unit 51$c$ to perform the presence/absence confirmation at an appropriate timing.

When the presence/absence confirming unit 51$c$ receives an instruction from the instructing unit 51$b$, the presence/absence confirming unit 51$c$ obtains information on the light receiving state from the wafer detecting mechanism and confirms the presence or absence of the wafer W on the basis of the information. In other words, when the light receiving state is "light shielding", the presence/absence confirming unit 51$c$ determines that the wafer W is present on the hand 11 and, when the light receiving state is "light reception", the presence/absence confirming unit 51$c$ determines that the wafer W is not present on the hand 11.

In this manner, after the hand 11 reaches the transfer position A3, the instructing unit 51$b$ performs the presence/absence confirmation of the wafer W by operating the gripping mechanism while retracting the hand 11. Therefore, the time required to convey the wafer W can be shortened compared with the case of performing the gripping operation and the presence/absence confirmation of the wafer W independently of the retracting operation of the hand 11.

Moreover, in the first embodiment, the gripping mechanism has a configuration in which the wafer W is gripped by holding the wafer W between the tip-side locking units 112 provided on the X-axis positive direction side of the wafer W and the pressing units 114 provided on the X-axis negative direction side of the wafer W. Therefore, it is possible to cause the wafer W to be less likely to be dropped before the gripping mechanism is operated after the hand 11 is retracted.

In other words, when the hand 11 is retracted, the wafer W tends to move relatively toward the tip side (X-axis positive direction side) of the hand 11 by inertia. However, because the tip-side locking units 112 are provided at the tip side of the hand 11, the wafer W is less likely to drop from the hand 11 even if the hand 11 is retracted before the gripping mechanism is operated.

When the robot 10 is caused to perform the receiving operation of the wafer W, the instructing unit 51$b$ instructs the presence/absence confirming unit 51$c$ a number of times to perform the presence/absence confirmation until the hand 11 reaches the end position A5. The presence/absence confirming unit 51$c$ makes the content of error information to be notified to the upper-level apparatus 60 different in the first presence/absence confirmation and the second and subsequent presence/absence confirmations.

Specifically, when it is confirmed in the first presence/absence confirmation that the wafer W is not present on the hand 11, the presence/absence confirming unit 51$c$ determines that reception of the wafer W is unsuccessful. On the other hand, when it is confirmed in the second and subsequent presence/absence confirmations that the wafer W is not present on the hand 11, the presence/absence confirming unit 51$c$ determines that the wafer W has dropped from the hand 11.

In other words, in the case where the wafer W drops from the hand 11 after the first presence/absence confirmation, even if it is confirmed in the first presence/absence confirmation that the wafer W is present on the hand 11, it is confirmed that the wafer W is not present on the hand 11 in the second and subsequent presence/absence confirmations.

Therefore, when it is confirmed that the wafer W is not present on the hand 11 in the second and subsequent presence/absence confirmations, the presence/absence confirming unit 51$c$ can determine that the wafer W has dropped from the hand 11.

In this manner, the upper-level apparatus 60 can easily monitor the conveying state of the wafer W by making the content of error information to be notified to the upper-level apparatus 60 different in the first presence/absence confirmation and the second and subsequent presence/absence confirmations.

Next, the wafer delivering operation will be explained. As shown in FIG. 6B, the instructing unit 51$b$ instructs the robot 10 to move the hand 11 along the route from a position B1 to a position B5 on the basis of the processing information and the operation pattern information 52$a$.

The position B1 is a start position, a position B3 is a transfer position, a position B4 is a horizontally retracting position, and the position B5 is an end position. Moreover, in this embodiment, a case where the reference position Pb matches a transfer position B3 is illustrated as an example.

The instructing unit 51$b$ advances the hand 11 from the start position B1 toward a lowering position B2 immediately above the transfer position B3. Next, the instructing unit 51b releases the gripping state by the gripping mechanism to free the wafer W and lowers the hand 11 from the lowering position B2 to the transfer position B3. Consequently, the wafer W placed on the hand 11 is delivered to the processing apparatus (for example, the processing apparatus 40).

After the hand 11 reaches the transfer position B3, the instructing unit 51b moves (advances) the hand 11 in the X-axis positive direction while moving (lowering) it in the Z-axis negative direction toward the horizontally retracting position B4 that is at the same height as the end position B5 and is offset forward from the transfer position B3.

In this manner, the instructing unit 51b moves the hand 11 obliquely forward from the transfer position B3 toward the horizontally retracting position B4. Consequently, rubbing of the wafer W can be prevented when delivering the wafer W.

In other words, when delivering the wafer W, the wafer W may be in contact with the tip-side locking units 112 of the gripping mechanism. In such a case, if the wafer W is delivered by lowering the hand 11 vertically downward, the wafer W may be rubbed against the tip-side locking units 112, therefore, the wafer W may be damaged or particles may be generated.

In contrast, in the first embodiment, because the tip-side locking units 112 are lowered while moving in a direction away from the wafer W by moving the hand 11 obliquely forward, the wafer W is not rubbed, therefore, it is possible to prevent the wafer W from being damaged and particles from being generated.

After the hand 11 reaches the horizontally retracting position B4, the instructing unit 51b retracts the hand 11 to the end position B5. Then, the instructing unit 51b operates the gripping mechanism for confirming presence or absence of the wafer W at the timing at which the hand 11 reaches the gripping execution position Px.

Moreover, the instructing unit 51b measures the time elapsed after the gripping operation is started and, when it is determined that a predetermined time has elapsed, the instructing unit 51b instructs the presence/absence confirming unit 51c to perform the presence/absence confirmation.

When the presence/absence confirming unit 51c receives an instruction from the instructing unit 51b, the presence/absence confirming unit 51c obtains information on the light receiving state from the wafer detecting mechanism and confirms the presence or absence of the wafer W on the basis of the information. Then, when it is confirmed that the wafer W is present on the hand 11, the presence/absence confirming unit 51c determines that delivery of the wafer W is unsuccessful and notifies the upper-level apparatus 60 (see FIG. 2) of the determination result.

In this manner, in a similar manner to the wafer receiving operation explained with reference to FIG. 6A, after the hand 11 reaches the transfer position B3, the instructing unit 51b performs the presence/absence confirmation of the wafer W by operating the gripping mechanism while retracting the hand 11. Therefore, the time required to convey the wafer W can be shortened compared with the case where the gripping operation and the presence/absence confirmation of the wafer W are performed independently of the retracting operation of the hand 11.

Next, a specific operation of the robot system 1 will be explained with reference to FIG. 7 and FIG. 8. First, the processing procedure of the wafer receiving processing will be explained with reference to FIG. 7. FIG. 7 is a flowchart illustrating the processing procedure of the wafer receiving processing. FIG. 7 illustrates the processing procedure in a case where the gripping mechanism is operated after the hand 11 starts retracting in the horizontal direction, however, the timing to operate the gripping mechanism may be before the hand 11 starts retracting in the horizontal direction.

As shown in FIG. 7, the instructing unit 51b of the robot control apparatus 50 moves the hand 11 from the start position A1 to the transfer position A3 (Step S101). Then, after the hand 11 reaches the transfer position A3, the instructing unit 51b moves the hand 11 obliquely backward until reaching the horizontally retracting position A4 (Step S102).

Next, after the hand 11 reaches the horizontally retracting position A4, the instructing unit 51b causes the hand 11 to start retracting in the horizontal direction (Step S103). Moreover, the instructing unit 51b causes the gripping mechanism to operate at the timing at which the hand 11 reaches the gripping execution position Px (Step S104).

Next, when the predetermined time has elapsed since the gripping mechanism is operated, the presence/absence confirming unit 51c determines whether the wafer W is present on the hand 11 (Step S105). In this processing, when the presence/absence confirming unit 51c determines that the wafer W is not present on the hand 11 (No in Step S105), the instructing unit 51b stops the robot 10 (Step S106). Moreover, the presence/absence confirming unit 51c notifies the upper-level apparatus 60 of error information indicating a failure to receive the wafer W (Step S107).

Moreover, when the presence/absence confirming unit 51c determines that the wafer W is present on the hand 11 in Step S105, (Yes in Step S105), the instructing unit 51b determines whether the hand 11 has reached the end position A5 (Step S108). Then, if the hand 11 has not reached the end position A5 (No in Step S108), the presence/absence confirming unit 51c determines whether the wafer W is present on the hand 11 again (Step S109). When the presence/absence confirming unit 51c determines that the wafer W is present on the hand 11 (Yes in Step S109), the presence/absence confirming unit 51c returns the processing to Step S108. The determination processing in Step S109 is performed at predetermined time intervals.

Moreover, in Step S109, when the presence/absence confirming unit 51c determines that the wafer W is not present on the hand 11 (No in Step S109), the instructing unit 51b stops the robot 10 (Step S110). Moreover, the presence/absence confirming unit 51c notifies the upper-level apparatus 60 of error information indicating that the wafer W has dropped (Step S111).

In contrast, when the instructing unit 51b determines that the hand 11 has reached the end position in Step S108 (Yes in Step S108), the robot control apparatus 50 stops retracting the hand 11 (Step S112) and ends the processing. The robot control apparatus 50 ends the processing also when the processing in Step S107 or Step S111 is finished.

Next, the processing procedure of the wafer delivering processing will be explained with reference to FIG. 8. FIG. 8 is a flowchart illustrating the processing procedure of the wafer delivering processing. FIG. 8 illustrates the processing procedure in a case where the gripping mechanism is operated after the hand 11 starts retracting in the horizontal direction, however, the timing to operate the gripping mechanism may be before the hand 11 starts retracting in the horizontal direction.

As shown in FIG. 8, the instructing unit 51b of the robot control apparatus 50 moves the hand 11 from the start position B1 to the transfer position B3 (Step S201). Then, after the hand 11 reaches the transfer position B3, the instructing unit 51b moves the hand 11 obliquely forward until reaching the horizontally retracting position B4 (Step S202).

Next, after the hand 11 reaches the horizontally retracting position B4, the instructing unit 51b causes the hand 11 to start retracting in the horizontal direction (Step S203). Moreover, the instructing unit 51b causes the gripping mechanism to operate at the timing at which the hand 11 reaches the gripping execution position Px (Step S204).

Next, when the predetermined time has elapsed since the gripping mechanism is operated, the presence/absence confirming unit 51c determines whether the wafer W is not present on the hand 11 (Step S205). In this processing, when the presence/absence confirming unit 51c determines that the wafer W is present on the hand 11 (No in Step S205), the instructing unit 51b stops the robot 10 (Step S206). Moreover, the presence/absence confirming unit 51c notifies the upper-level apparatus 60 of error information indicating a failure to deliver the wafer W (Step S207).

In contrast, when the presence/absence confirming unit 51c determines that the wafer W is not present on the hand 11 in Step S205, (Yes in Step S205), the instructing unit 51b determines whether the hand 11 has reached the end position B5 (Step S208). Then, when the instructing unit 51b determines that the hand 11 has reached the end position B5 (Yes in Step S208), the instructing unit 51b stops retracting the hand 11 (Step S209) and ends the processing.

If the hand 11 has not reached the end position B5 (No in Step S208), the processing in Step S208 is repeated until the hand 11 reaches the end position B5. Moreover, the robot control apparatus 50 ends the processing also when the processing in Step S207 is finished.

As described above, the robot system 1 according to the first embodiment includes the robot 10 and the robot control apparatus 50. The robot 10 includes the hand 11 including the gripping mechanism that grips the wafer W and the arm 12 that moves the hand 11. Moreover, the robot control apparatus 50 controls the robot 10. Then, when the robot control apparatus 50 causes the robot 10 to perform transfer of the wafer W at the transfer position by controlling the robot 10, the robot control apparatus 50 performs the presence/absence confirmation of the wafer W by operating the gripping mechanism while retracting the hand 11 after the hand 11 reaches the transfer position.

Therefore, according to the robot system 1 in the first embodiment, the time required to convey the wafer W can be shortened.

Moreover, when the robot control apparatus 50 according to the first embodiment causes the robot 10 to perform transfer of the wafer W at the transfer position by controlling the robot 10, the robot control apparatus 50 moves the hand 11 in the horizontal direction while moving it in the vertical direction after the hand 11 reaches the transfer position.

Therefore, according to the robot system 1 in the first embodiment, rubbing of the wafer W can be prevented when transferring the wafer W.

The wafer receiving operation and the wafer delivering operation are not limited to the operation pattern illustrated in the first embodiment.

Figure 9A:
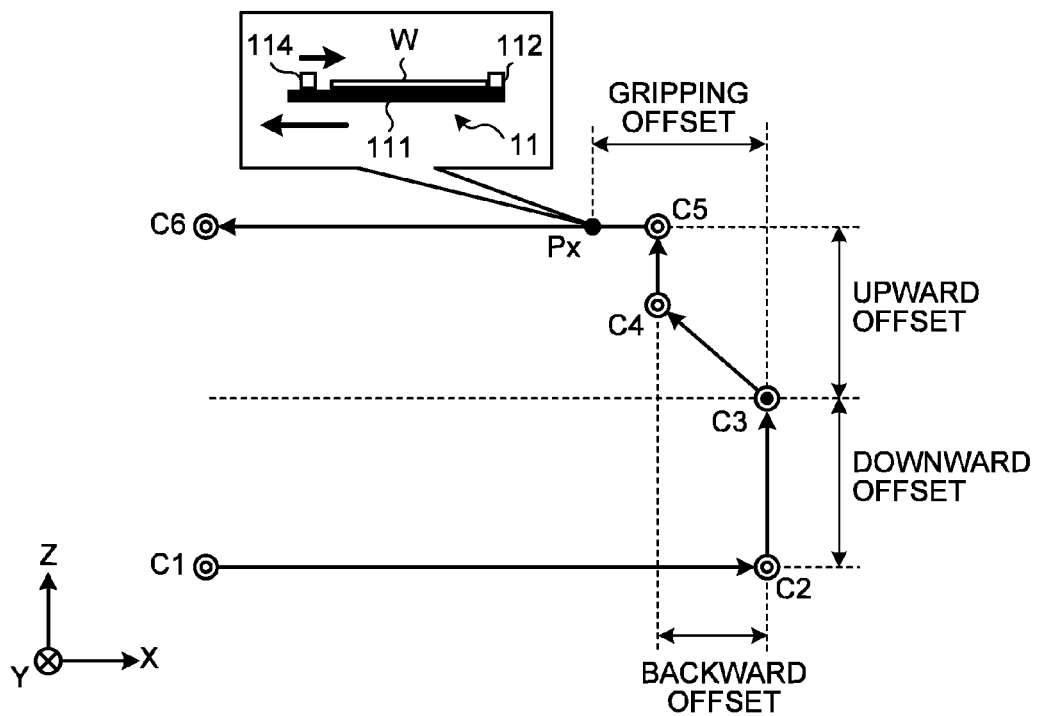
FIG. 9A is an explanatory diagram of the wafer receiving operation according to a second embodiment.
Figure 9B:
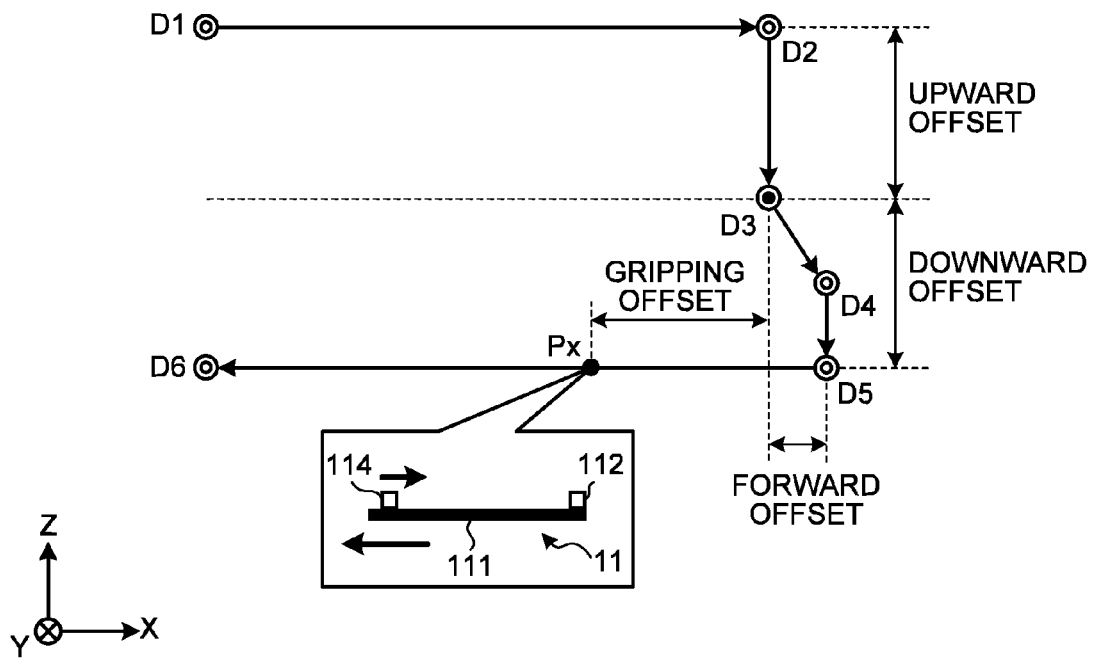
FIG. 9B is an explanatory diagram of the wafer delivering operation according to the second embodiment.

In the following, another operation example of the wafer receiving operation and the wafer delivering operation will be explained with reference to FIG. 9A and FIG. 9B. FIG. 9A is an explanatory diagram of the wafer receiving operation according to the second embodiment and FIG. 9B is an explanatory diagram of the wafer delivering operation according to the second embodiment.

First, the wafer receiving operation according to the second embodiment will be explained with reference to FIG. 9A. As shown in FIG. 9A, the instructing unit 51b instructs the robot 10 to move the hand 11 along the route from a position C1 to a position C6 on the basis of the processing information and the operation pattern information 52a.

The position C1 is a start position, a position C3 is a transfer position, a position C5 is a horizontally retracting position, and the position C6 is an end position. Moreover, in this embodiment, a case where the reference position Pb matches the transfer position C3 is illustrated as an example.

The instructing unit 51b advances the hand 11 from the start position C1 toward a raising position C2 immediately below the transfer position C3. Next, the instructing unit 51b raises the hand 11 from the raising position C2 to the transfer position C3. Consequently, the wafer W is placed on the hand 11.

After the hand 11 reaches the transfer position C3, the instructing unit 51b moves the hand 11 obliquely backward toward a position C4 that is at a height between the transfer position C3 and the end position C6 and is located immediately below the horizontally retracting position C5. Thereafter, after the hand 11 is raised from the position C4 to the horizontally retracting position C5, the instructing unit 51b retracts the hand 11 to the end position C6.

Next, the wafer delivering operation will be explained with reference to FIG. 9B. As shown in FIG. 9B, the instructing unit 51b instructs the robot 10 to move the hand 11 along the route from a position D1 to a position D6 on the basis of the processing information and the operation pattern information 52a.

The position D1 is a start position, a position D3 is a transfer position, a position D5 is a horizontally retracting position, and the position D6 is an end position. Moreover, in this embodiment, in a similar manner to FIG. 9A, a case where the reference position Pb matches the transfer position D3 is illustrated as an example.

The instructing unit 51b advances the hand 11 from the start position D1 toward a lowering position D2 immediately above the transfer position D3. Next, the instructing unit 51b releases the gripping state by the gripping mechanism to free the wafer W and lowers the hand 11 from the lowering position D2 to the transfer position D3. Consequently, the wafer W placed on the hand 11 is delivered to the processing apparatus (for example, the processing apparatus 40).

After the hand 11 reaches the transfer position D3, the instructing unit 51b moves the hand 11 obliquely forward toward a position D4 that is at a height between the transfer position D3 and the end position D6 and is located immediately above the horizontally retracting position D5. Thereafter, after the hand 11 is lowered from the position D4 toward the horizontally retracting position D5, the instructing unit 51b retracts the hand 11 to the end position D6.

In this manner, in the second embodiment, after moving the hand 11 in the horizontal direction from the transfer position while moving it in the vertical direction, the hand 11 is further moved in the vertical direction and then the hand 11 is retracted in the horizontal direction.

This operation pattern is effective, for example, when the work space is relatively narrow. In other words, even when the work space is relatively narrow, the robot 10 can transfer the wafer W while preventing the wafer W from being rubbed by using the operation pattern according to the second embodiment.

For example, in some cases, the depth of the processing apparatus is small and the distance from the transfer position to the horizontally retracting position cannot be effectively secured depending on the shape and size of the processing apparatus. In such a case, even if the depth of the processing apparatus is small, the hand 11 can be effectively moved obliquely forward by using the operation pattern shown in FIG. 9B, therefore, rubbing of the wafer W can be appropriately prevented.

In the first embodiment, the hand 11 is moved in an oblique direction until reaching the horizontally retracting position from the transfer position, and such an operation pattern is effective, for example, when the work space is relatively wide. In other words, when the operation pattern shown in FIG. 6A and FIG. 6B is used, the number of stop points of the hand 11 is reduced compared with the operation pattern shown in FIG. 9A and FIG. 9B, therefore, the time required to convey the wafer W can be shortened.

In the first embodiment and the second embodiment, a case where the hand 11 is moved obliquely after the hand 11 reaches the transfer position is illustrated as an example. However, the hand 11 may be moved obliquely before the hand 11 reaches the transfer position.

Figure 10A:
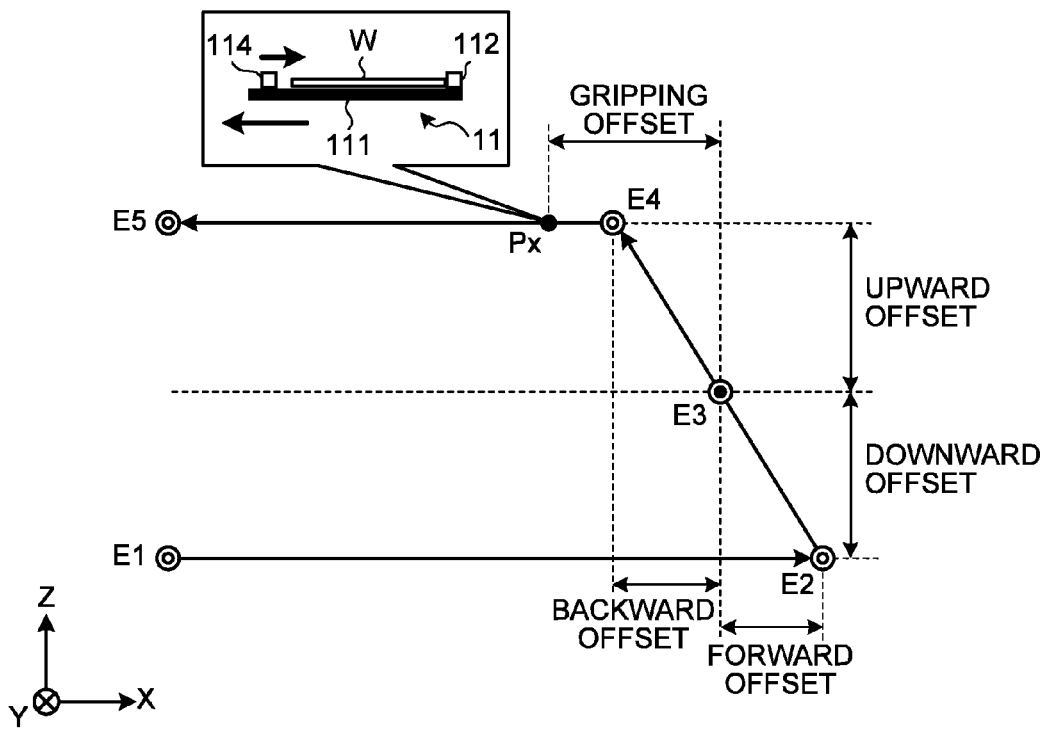
FIG. 10A is an explanatory diagram of the wafer receiving operation according to a third embodiment.
Figure 10B:
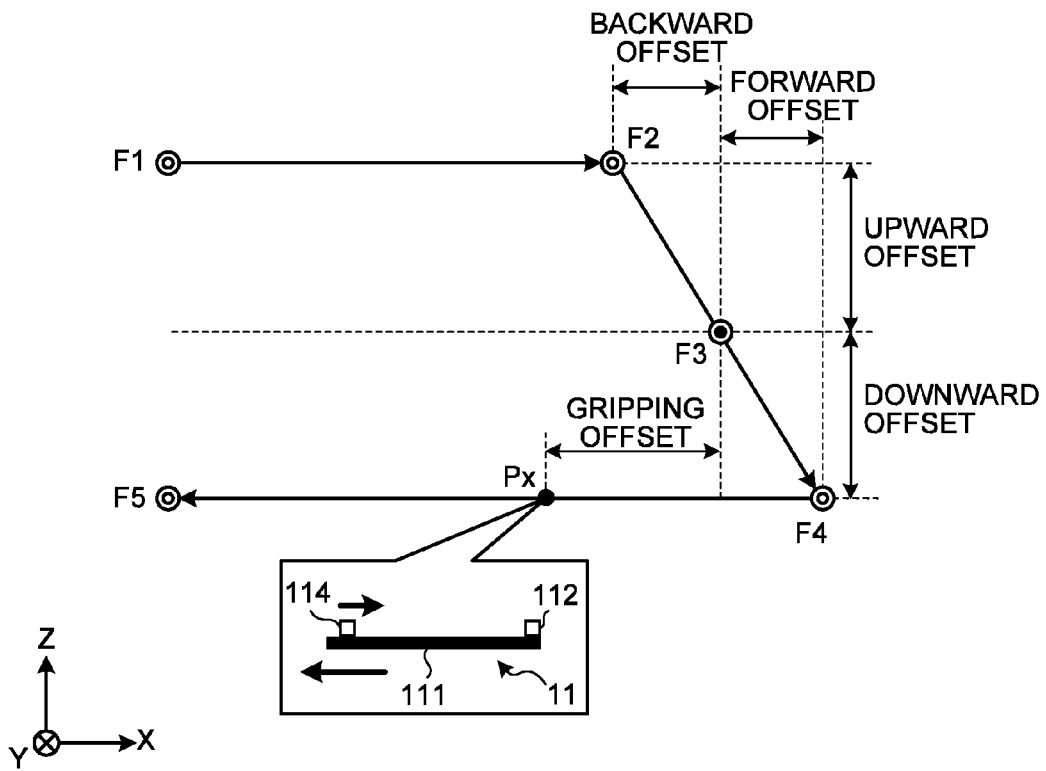
FIG. 10B is an explanatory diagram of the wafer delivering operation according to the third embodiment.

In the following, the wafer receiving operation and the wafer delivering operation according to a third embodiment will be explained with reference to FIG. 10A and FIG. 10B. FIG. 10A is an explanatory diagram of the wafer receiving operation according to the third embodiment and FIG. 10B is an explanatory diagram of the wafer delivering operation according to the third embodiment.

First, the wafer receiving operation according to the third embodiment will be explained with reference to FIG. 10A. As shown in FIG. 10A, the instructing unit 51b instructs the robot 10 to move the hand 11 along the route from a position E1 to a position E5 on the basis of the processing information and the operation pattern information 52a.

The position E1 is a start position, a position E3 is a transfer position, a position E4 is a horizontally retracting position, and the position E5 is an end position. Moreover, in the operation pattern according to the third embodiment, a position E2, the transfer position E3, and the horizontally retracting position E4 are aligned. In this embodiment, a case where the reference position Pb matches the transfer position E3 is illustrated as an example.

The instructing unit 51b advances the hand 11 from the start position E1 toward the position E2 that is below the transfer position E3 and is on the far side of the transfer position E3. Next, when the hand 11 reaches the position E2, the instructing unit 51b moves the hand 11 obliquely backward toward the horizontally retracting position E4.

At this time, because the position E2, the transfer position E3, and the horizontally retracting position E4 are aligned, the hand 11 reaches the horizontally retracting position E4 by passing obliquely through the transfer position E3. Then, the wafer W is placed on the hand 11 by the hand 11 passing through the transfer position E3.

After the hand 11 reaches the horizontally retracting position E4, the instructing unit 51b retracts the hand 11 to the end position E5.

Next, the wafer delivering operation according to the third embodiment will be explained with reference to FIG. 10B. As shown in FIG. 10B, the instructing unit 51b instructs the robot 10 to move the hand 11 along the route from a position F1 to a position F5 on the basis of the processing information and the operation pattern information 52a.

The position F1 is a start position, a position F3 is a transfer position, a position F4 is a horizontally retracting position, and the position F5 is an end position. In a similar manner to FIG. 10A, the position F2, the transfer position F3, and the horizontally retracting position F4 are aligned. In this embodiment, a case where the reference position Pb matches the transfer position F3 is illustrated as an example.

The instructing unit 51b advances the hand 11 from the start position F1 toward the position F2 that is above the transfer position F3 and is on the near side of the transfer position F3. Next, when the hand 11 reaches the position F2, the instructing unit 51b moves the hand 11 obliquely forward toward the horizontally retracting position F4.

Consequently, in a similar manner to the case shown in FIG. 10A, the hand 11 reaches the horizontally retracting position F4 by passing obliquely through the transfer position F3. Then, the wafer W placed on the hand 11 is delivered to the processing apparatus (for example, the processing apparatus 40) by the hand 11 passing through the transfer position F3. After the hand 11 reaches the horizontally retracting position F4, the instructing unit 51b retracts the hand 11 to the end position F5.

In this manner, in the third embodiment, after the hand 11 reaches a predetermined position (position F2) that is above the transfer position and is on the near side of the transfer position or a predetermined position (position E2) that is below the transfer position and is on the far side of the transfer position, the hand 11 is caused to reach the transfer position by moving the hand 11 in the horizontal direction while moving it in the vertical direction. Consequently, rubbing of the wafer W can be prevented more reliably.

In other words, in the robot system, the transfer position specified by the robot control apparatus may be slightly displaced from the actual transfer position. Even in such a case, if the hand 11 is moved obliquely from before the hand 11 passes through the transfer positions E3 and F3 specified by the robot control apparatus 50 until after the hand 11 passes through the transfer positions E3 and F3, even if the transfer position is displaced, the wafer W can be appropriately prevented from being rubbed.

Moreover, the operation pattern according to the third embodiment is effective when the work space is relatively wide in a similar manner to the operation pattern according to the first embodiment. In other words, when the operation pattern according to the third embodiment is used, the number of stop points of the hand 11 is reduced compared with the operation pattern according to the second embodiment, therefore, the time required to convey the wafer W can be shortened.

Furthermore, in the third embodiment, the position E2, the transfer position E3, and the horizontally retracting position E4 are aligned and the position F2, the transfer position F3, and the horizontally retracting position F4 are aligned. Therefore, the instructing unit 51b can move the hand 11 obliquely without stopping the hand 11 at the transfer positions E3 and F3. Consequently, the number of stop points can be further reduced compared with the operation patterns according to the first and second embodiments and therefore the time required to convey the wafer W can be shortened.

Figure 11A:
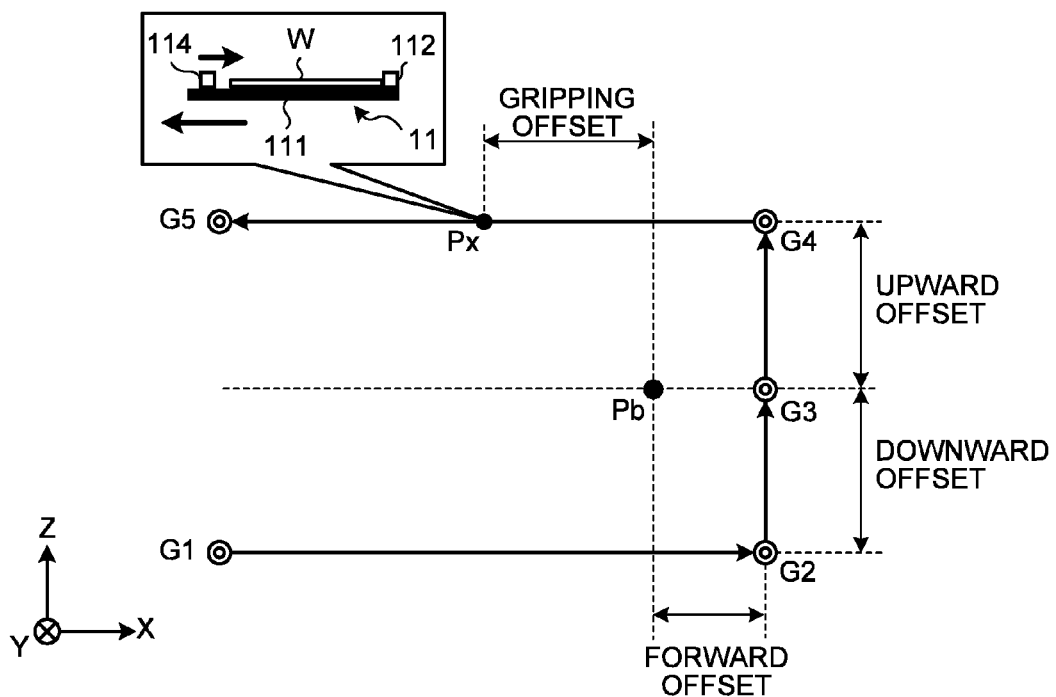
FIG. 11A is another explanatory diagram of the wafer receiving operation.

In each of the above embodiments, a case of moving the hand 11 in an oblique direction is explained as an example, however, the instructing unit 51b does not necessarily need to move the hand 11 in an oblique direction. In the following, an example of such a case will be explained with reference to FIG. 11A and FIG. 11B. FIG. 11A is another explanatory diagram of the wafer receiving operation and FIG. 11B is another explanatory diagram of the wafer delivering operation.

When the robot 10 is caused to perform the wafer receiving operation, as shown in FIG. 11A, the instructing unit 51b instructs the robot 10 to move the hand 11 along the route from a position G1 to a position G5. The position G1 is a start position, a position G2 is a raising position, a position G3 is a transfer position, a position G4 is a horizontally retracting position, and the position G5 is an end position.

The raising position G2 and the horizontally retracting position G4 are each arranged at a position that overlaps with the transfer position G3 in the vertical direction. Therefore, the hand 11 moves only in the horizontal direction between the start position G1 and the raising position G2 and between the horizontally retracting position G4 and the end position G5 and moves only in the vertical direction between the raising position G2 and the transfer position G3 and between the transfer position G3 and the horizontally retracting position G4.

Figure 11B:
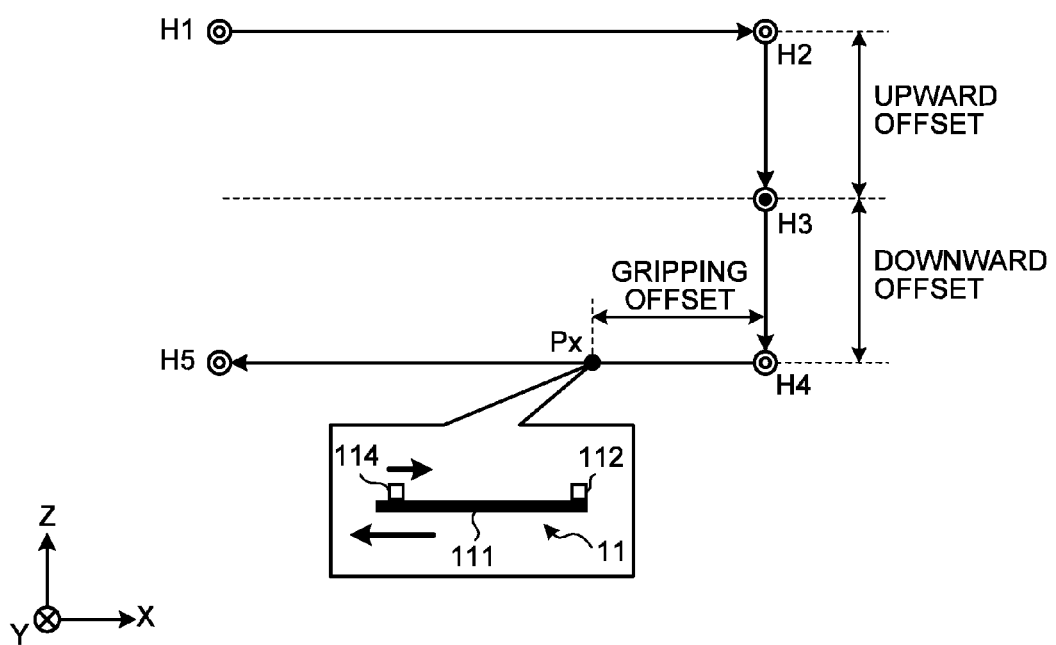
FIG. 11B is another explanatory diagram of the wafer delivering operation.

Moreover, when the robot 10 is caused to perform the wafer delivering operation, as shown in FIG. 11B, the instructing unit 51b instructs the robot 10 to move the hand 11 along the route from a position H1 to a position H5. The position H1 is a start position, a position H2 is a lowering position, a position H3 is a transfer position, a position H4 is a horizontally retracting position, and the position H5 is an end position. In this embodiment, a case where the reference position Pb matches the transfer position H3 is illustrated as an example.

The lowering position H2 and the horizontally retracting position H4 are each arranged at a position that overlaps with the transfer position H3 in the vertical direction. Therefore, the hand 11 moves only in the horizontal direction between the start position H1 and the lowering position H2 and between the horizontally retracting position H4 and the end position H5 and moves only in the vertical direction between the lowering position H2 and the transfer position H3 and between the transfer position H3 and the horizontally retracting position H4.

In such a manner, the robot system 1 may have an operation pattern in which the hand 11 is not moved obliquely.

Moreover, in each of the above embodiments, the wafer receiving operation and the wafer delivering operation are explained with reference to a plurality of operation patterns, however, the robot control apparatus 50 may appropriately switch the operation patterns described above in accordance with the processing apparatus to be a transfer source or a transfer destination. In other words, rubbing of the wafer W can be prevented more reliably by selecting an appropriate operation pattern depending on the shape and size of the processing apparatus.

Moreover, in each of the above embodiments, a case where two hands are provided to the tip portion of one arm corresponding to a single arm is explained as an example, however, the number of hands is not limited and may be three or more or may be only one.

Moreover, in each of the above embodiments, an example of a single-arm robot is explained, however, a multi-arm robot having two or more arms may be applied.

Moreover, in each of the above embodiments, a case where a thin plate-shaped work to be conveyed is a wafer is explained as an example, however, the work to be conveyed may be, for example, a glass substrate of a liquid crystal panel display. Moreover, the work does not necessarily need to be a substrate as long as it has a thin plate shape.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
a robot including:
a hand including a gripping mechanism that grips a thin plate-shaped workpiece; and
an arm that moves the hand; and
a robot control apparatus that controls the robot,
the gripping mechanism including:
a pressing unit capable of advancing and retracting with respect to the workpiece placed on the hand; and
a locking unit provided on a side opposite to the pressing unit with the workpiece therebetween, the gripping mechanism advancing the pressing unit toward the workpiece and pressing the workpiece against the locking unit to grip the workpiece, wherein
in a case of causing the robot to transfer the workpiece at a predetermined workpiece transfer position by controlling the robot, the robot control apparatus:
operates the gripping mechanism with the hand in motion while causing the hand to retract after the hand reaches the workpiece transfer position; and
performs a presence/absence confirmation of the workpiece with the hand in motion and when a predetermined time has elapsed from a time at which the pressing unit starts advancing toward the workpiece, the predetermined time being longer than an interval from the time at which the pressing unit starts advancing toward the workpiece to a time at which the workpiece is pressed against the locking unit when the workpiece is present on the hand.

2. The robot system according to claim 1, wherein the robot control apparatus, when causing the robot to perform an operation of gripping the workpiece, performs the presence/absence confirmation a plurality of times and determines that the workpiece has dropped when it is confirmed that the workpiece is not present on the hand in second and subsequent presence/absence confirmations.

3. The robot system according to claim 2, wherein the robot control apparatus determines that reception of the workpiece is unsuccessful when it is confirmed that the workpiece is not present on the hand in a first presence/absence confirmation.

4. The robot system according to claim 1, wherein the robot control apparatus causes the hand to move in a vertical direction and also in a horizontal direction after the hand reaches the workpiece transfer position, and then operates the gripping mechanism with the hand moving in the horizontal direction.

5. The robot system according to claim 1, wherein the robot control apparatus:
after the hand reaches the workpiece transfer position, causes the hand to move in a vertical direction and also in a horizontal direction until the hand reaches a horizontal retracted position offset to the robot side from a reference position set closer to the robot than the workpiece transfer position; and
after the hand reaches the horizontal retracted position, causes the hand to retract in the horizontal direction to operate the gripping mechanism at a time at which the hand reaches a gripping execution position offset to a position closer to the robot side than the horizontal retracted position from the reference position.

6. The robot system according to claim 1, wherein the predetermined time is shorter than an interval from the time at which the pressing unit starts advancing toward the workpiece to a time at which the workpiece arrives at an end position.

7. A robot system comprising:
a robot including:
- a hand including a gripping mechanism that grips a thin plate-shaped workpiece; and
- an arm that moves the hand; and a robot control means for controlling the robot,
the gripping mechanism including:
- a pressing unit capable of advancing and retracting with respect to the workpiece placed on the hand; and
- a locking unit provided on a side opposite to the pressing unit with the workpiece therebetween, the gripping mechanism advancing the pressing unit toward the workpiece and pressing the workpiece against the locking unit to grip the workpiece, wherein
- in a case of causing the robot to transfer the workpiece at a predetermined workpiece transfer position by controlling the robot, the robot control means:

operates the gripping mechanism with the hand in motion while causing the hand to retract after the hand reaches the workpiece transfer position; and performs a presence/absence confirmation of the workpiece when the hand is in motion and when a predetermined time has elapsed from a time at which the pressing unit starts advancing toward the workpiece, the predetermined time being longer than an interval from the time at which the pressing unit starts advancing toward the workpiece to a time at which the workpiece is pressed against the locking unit when the workpiece is present on the hand.

8. The robot system according to claim 7, wherein the robot control means, when causing the robot to perform an operation of gripping the workpiece, performs the presence/absence confirmation a plurality of times and determines that the workpiece has dropped when it is confirmed that the workpiece is not present on the hand in second and subsequent presence/absence confirmations.

9. The robot system according to claim 8, wherein the robot control means determines that reception of the workpiece is unsuccessful when it is confirmed that the workpiece is not present on the hand in a first presence/absence confirmation.

10. The robot system according to claim 7, wherein the robot control means causes the hand to move in a vertical direction and also in a horizontal direction after the hand reaches the workpiece transfer position, and then operates the gripping mechanism with the hand moving in the horizontal direction.

11. The robot system according to claim 7, wherein the robot control means:
- after the hand reaches the workpiece transfer position, causes the hand to move in a vertical direction and also in a horizontal direction until the hand reaches a horizontal retracted position offset to the robot side from a reference position set closer to the robot than the workpiece transfer position; and
- after the hand reaches the horizontal retracted position, causes the hand to retract in the horizontal direction to operate the gripping mechanism at a time at which the hand reaches a gripping execution position offset to a position closer to the robot side than the horizontal retracted position from the reference position.

* * * * *